United States Patent
Katz

(10) Patent No.: US 10,761,610 B2
(45) Date of Patent: *Sep. 1, 2020

(54) VEHICLE SYSTEMS AND METHODS FOR INTERACTION DETECTION

(71) Applicant: EYESIGHT MOBILE TECHNOLOGIES LTD., Herzliya (IL)

(72) Inventor: Itay Katz, Tel Aviv (IL)

(73) Assignee: Eyesight Mobile Technologies, Ltd., Herzliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/984,999

(22) Filed: May 21, 2018

(65) Prior Publication Data

US 2018/0356896 A1   Dec. 13, 2018

Related U.S. Application Data

(63) Continuation of application No. 14/775,657, filed as application No. PCT/IB2014/000908 on Mar. 13, 2014, now Pat. No. 9,977,507.

(60) Provisional application No. 61/782,678, filed on Mar. 14, 2013.

(51) Int. Cl.
  *G06F 3/01* (2006.01)
  *H04N 5/232* (2006.01)
  (Continued)

(52) U.S. Cl.
  CPC ............. *G06F 3/017* (2013.01); *G06F 1/325* (2013.01); *G06F 1/3231* (2013.01); *G06F 3/011* (2013.01);
  (Continued)

(58) Field of Classification Search
  CPC ........ G06F 3/0304; G06F 3/044; G06F 3/048; G06F 3/018; G06F 3/017; G06F 3/041;
  (Continued)

(56) References Cited

U.S. PATENT DOCUMENTS

2005/0057524 A1* 3/2005 Hill ...................... G06F 3/0421
                                                              345/173
2009/0303176 A1   12/2009 Chen et al.
(Continued)

FOREIGN PATENT DOCUMENTS

WO   WO 2012/054060      4/2012
WO   WO 2013/021385      2/2013
WO   WO-2013021385 A2 *  2/2013   ............. G06F 3/017

OTHER PUBLICATIONS

International Search Report from the U.S. Patent Office for International Application No. PCT/IB2014/00908 dated Jan. 7, 2015.
(Continued)

*Primary Examiner* — Md Saiful A Siddiqui
(74) *Attorney, Agent, or Firm* — Finnegan, Henderson, Farabow, Garrett & Dunner LLP

(57) ABSTRACT

Systems, methods, and non-transitory computer-readable media are disclosed. For example, a dual sensor control device is disclosed that includes at least one processor for receiving information from a proximity sensor and an image sensor. The processor may be configured to receive first data from the proximity sensor while the image sensor is in a first state, determine, using the first data, a presence of an object in proximity to the proximity sensor. The processor may also be configured to output, based on the determined presence of the object in proximity to the proximity sensor, a signal to the image sensor to cause the image sensor to enter a second state, different from the first state. The processor may also be configured to receive second data from the image sensor in the second state, and output at least one of a message and a command associated with the second data.

21 Claims, 7 Drawing Sheets

(51) Int. Cl.
*G06K 9/00* (2006.01)
*G06F 1/3231* (2019.01)
*G06F 3/03* (2006.01)
*G06F 1/3234* (2019.01)

(52) U.S. Cl.
CPC ........ *G06F 3/0304* (2013.01); *G06K 9/00201* (2013.01); *G06K 9/00355* (2013.01); *H04N 5/23222* (2013.01); *H04N 5/23229* (2013.01); *G06K 2209/40* (2013.01); *Y02D 10/173* (2018.01)

(58) Field of Classification Search
CPC ........ G06F 1/3231; G06F 1/325; G06F 3/011; G06F 3/01
See application file for complete search history.

(56) References Cited

U.S. PATENT DOCUMENTS

| | | |
|---|---|---|
| 2012/0176303 A1 | 7/2012 | Miyake |
| 2012/0280905 A1 | 11/2012 | Vonog et al. |
| 2012/0287035 A1 | 11/2012 | Valko et al. |
| 2012/0306770 A1 | 12/2012 | Moore et al. |
| 2013/0002550 A1 | 1/2013 | Zalewski |
| 2013/0009875 A1* | 1/2013 | Fry .................. G06F 3/017 345/168 |
| 2013/0215027 A1* | 8/2013 | Van Lydegraf ......... G06F 3/017 345/158 |
| 2013/0229508 A1 | 9/2013 | Li et al. |
| 2014/0092029 A1* | 4/2014 | Nguyen ............... G06F 1/169 345/173 |
| 2014/0306877 A1 | 10/2014 | Katz et al. |

OTHER PUBLICATIONS

Notification of Transmittal of the International Search Report and the Written Opinion of the International Search Authority for International Application No. PCT/IB2014/00908 dated Jan. 7, 2015.

First Office Action for Chinese Patent Application No. 201480014533.3 from the State Intellectual Property Office of P.R. China, dated Jul. 14, 2017, 10 pgs.

* cited by examiner

VEHICLE SYSTEMS AND METHODS FOR INTERACTION DETECTION

RELATED APPLICATIONS

This application is a continuation of U.S. patent application Ser. No. 14/775,657, filed Sep. 11, 2015 (now U.S. Pat. No. 9,977,507, which claims priority to U.S. provisional application No. 61/782,678, filed Mar. 14, 2013 Each of the previously filed applications is hereby incorporated by reference in its entirety.

TECHNICAL FIELD

The present disclosure relates to the field of touch-free gesture detection and, more particularly, devices and computer-readable media for using a proximity sensor and an image sensor to detect touch-free gestures.

BACKGROUND

Permitting a user to interact with a device or an application running on a device is useful in many different settings. For example, keyboards, mice, and joysticks are often included with electronic systems to enable a user to input data, manipulate data, and cause a processor of the system to execute a variety of other actions. Increasingly, however, touch-based input devices, such as keyboards, mice, and joysticks, are being replaced by, or supplemented with, devices that permit touch-free user interaction. For example, a system may include an image sensor to capture images of a user, including, for example, a user's hands and/or fingers. A processor may be configured to receive such images and initiate actions based on touch-free gestures performed by the user.

Image sensors often consume relatively large amounts of device resources. For example, an image sensor may require power (often supplied by a battery having a limited charge) and data from the image sensor may need to be analyzed by a processor. Therefore, it may be desirable to limit the resources required by an image sensor while maintaining touch-free gesture detection functionality. Improvements in techniques for detecting and acting upon touch-free gestures are desirable.

SUMMARY

In one disclosed embodiment, a dual sensor control device is disclosed. The dual sensor control device includes at least one processor for receiving information from a proximity sensor and an image sensor. The at least one processor may be configured to receive first data from the proximity sensor while the image sensor is in a first state, determine, using the first data, a presence of an object in proximity to the proximity sensor, output, based on the determined presence of the object in proximity to the proximity sensor, a signal to the image sensor to cause the image sensor to enter a second state, different from the first state, receive second data from the image sensor in the second state, and output at least one of a message and a command associated with the second data.

In another disclosed embodiment, a three-dimensional control device is disclosed. The three-dimensional control device includes at least one processor for receiving information from a proximity sensor and an image sensor. The at least one processor may be configured to receive first data, associated with a detected object, from the proximity sensor while the proximity sensor operates at a first level of power consumption, wherein the first data is reflective of at least a one-dimensional position of the object relative to the proximity sensor, receive second data, associated with the detected object, from the image sensor while the image sensor operates at a second level of power consumption greater than the first level, wherein the second data is reflective of at least a two-dimensional position of the object relative to the image sensor, and coordinate the first data and the second data to obtain three-dimensional information associated with the detected object.

Additional aspects related to the embodiments will be set forth in part in the description which follows, and in part will be understood from the description, or may be learned by practice of the disclosed embodiments.

It is to be understood that both the foregoing general description and the following detailed description are exemplary and explanatory only and are not restrictive of the claims.

DETAILED DESCRIPTION

Reference will now be made in detail to the example embodiments, which are illustrated in the accompanying drawings. Wherever possible, the same reference numbers will be used throughout the drawings to refer to the same or like parts.

Figure 1:
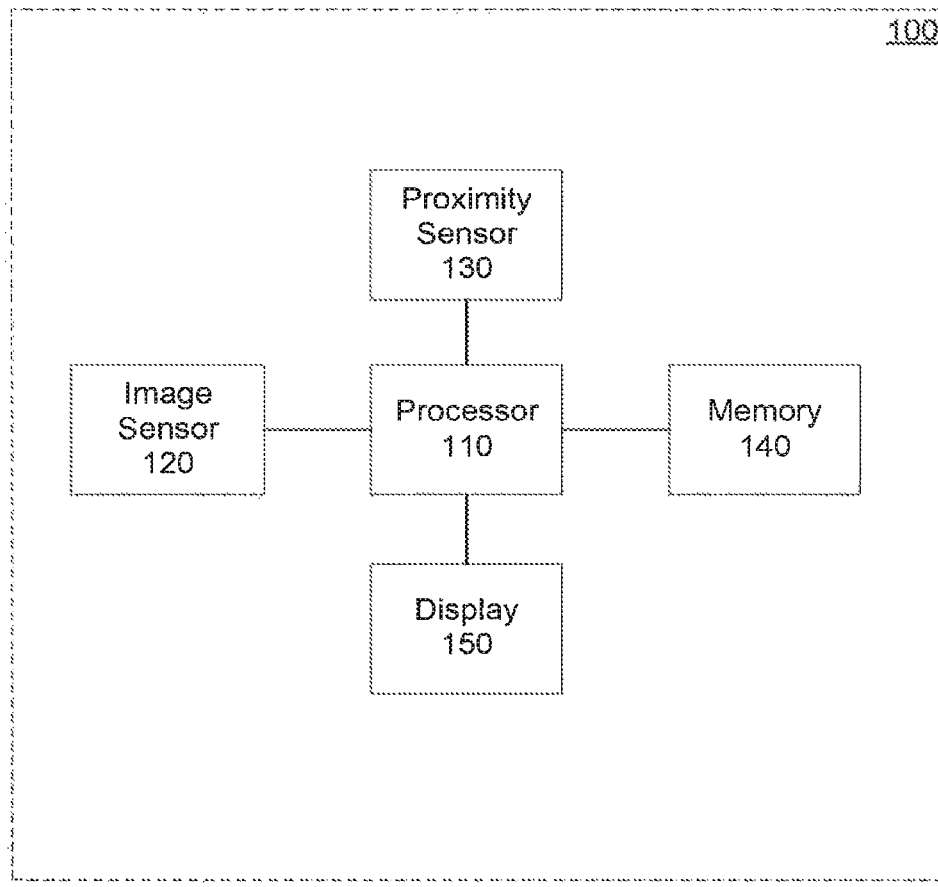
FIG. 1 illustrates an example dual sensor control device that may be used for implementing the disclosed embodiments.

Inventive embodiments may include a dual sensor control device, which may include any device that employs at least two sensors for detecting one or more of proximity, image data, or environmental conditions. FIG. 1 is a diagram illustrating one example of a dual sensor control device 100 that may be used for implementing the disclosed embodiments. The dual sensor control device may be incorporated in, among other things, a mobile phone, smart-glasses, a personal computer (PC), an entertainment device, a set top box, a television, a mobile game machine, a tablet computer, an e-reader, a portable game console, a portable computer such as a laptop or ultrabook, a home appliance such as a kitchen appliance, a communication device, an air conditioning thermostat, a docking station, a game machine such as a mobile video gaming device, a digital camera, a watch, an entertainment device, speakers, a Smart Home device, a media player or media system, a location-based device, a pico projector or an embedded projector, a medical device such as a medical display device, a vehicle, an in-car/in-air infotainment system, a navigation system, a wearable device, an augmented reality-enabled device, wearable goggles, a robot, interactive digital signage, a digital kiosk, a vending machine, an automated teller machine (ATM), or any other apparatus that may receive data from a user or output data to a user. Moreover, the dual sensor control device may be handheld (e.g., held by a user's hand) or non-handheld. As shown in FIG. 1, device 100 may include a processor 110, an image sensor 120, a proximity sensor 130, a memory 140, and a display 150.

Embodiments of the invention may include at least one processor. As used herein, a processor may include, among other things, any electric circuit that may be configured to perform a logic operation on at least one input variable, including, for example one or more integrated circuits, microchips, microcontrollers, and microprocessors, which may be all or part of a central processing unit (CPU), a digital signal processor (DSP), a field programmable gate array (FPGA), a graphical processing unit (GPU), or any other circuit known to those skilled in the art that may be suitable for executing instructions or performing logic operations. Exemplary processor 110 in FIG. 1, may receive information from a proximity sensor and an image sensor. For example, as depicted in FIG. 1, processor 110 may be connected to at least one image sensor 120 and at least one proximity sensor 130 such that processor 110 may receive information from the at least one image sensor 120 and the at least one proximity sensor 130. Although one processor is shown in FIG. 1, device 100 may include a plurality of processors, which may provide different processing capabilities (e.g., dedicated graphics processing) and/or that may provide parallel processing functionality. Multiple functions may be accomplished using a single processor or multiple related and/or unrelated functions may be divided among multiple processors.

Embodiments of the invention may involve an image sensor. An image sensor may include, among other things, one or more of a CCD image sensor, a CMOS image sensor, a camera, a light sensor, an IR sensor, an ultrasonic sensor, a proximity sensor, a shortwave infrared (SWIR) image sensor, a reflectivity sensor, or any other device that is capable of sensing visual characteristics of an environment. Moreover, an image sensor may include, for example, a single photosensor or 1-D line sensor capable of scanning an area, a 2-D sensor, or a stereoscopic sensor that includes, for example, a plurality of 2-D image sensors. Image sensor may be associated with a lens for focusing a particular area of light onto the image sensor. Images captured by image sensor may be digitized by image sensor and input to a processor, or may be input to a processor in analog form and digitized by processor. By way of example, FIG. 1 depicts image sensor 120 as part of device 100. However, in alternative embodiments, image sensor 120 may be external to device 100.

Embodiments may also involve a proximity sensor. Exemplary proximity sensors may include, among other things, one or more of a capacitive sensor, a capacitive displacement sensor, a laser rangefinder, a sensor that uses time-of-flight (TOF) technology, an IR sensor, a sensor that detects magnetic distortion, or any other sensor that is capable of generating information indicative of the presence of an object in proximity to the proximity sensor. In some embodiments, the information generated by proximity sensor may include a distance of the object to the proximity sensor. A proximity sensor may be a single sensor or may be a set of sensors. FIG. 1 depicts proximity sensor 130 as part of device 100. However, in alternative embodiments, proximity sensor 130 may be external to device 100.

Embodiments may also include memory. Memory may include, for example, one or more of persistent memory, ROM, EEPROM, EAROM, flash memory devices, magnetic disks, magneto optical disks, CD-ROM, DVD-ROM, Blu-ray, and the like, and may contain instructions (i.e., software or firmware) or other data. By way of example, FIG. 1 depicts memory 140 connected to processor 110. Generally, processor 110 may receive instructions and data stored by memory 140. Thus, in some embodiments, processor 110 executes the software or firmware to perform functions by operating on input data and generating output. However, processor 110 may also be, for example, dedicated hardware or an application-specific integrated circuit (ASIC) that performs processes by operating on input data and generating output. Processor 110 may be any combination of dedicated hardware, one or more ASICs, one or more general purpose processors, one or more DSPs, one or more GPUs, or one or more other processors capable of processing digital information. FIG. 1 depicts memory 140 as part of device 100. However, in alternative embodiments, memory 140 may be external to device 100.

Embodiments may also include a display. A display may include, for example, one or more of a television set, computer monitor, head-mounted display, broadcast reference monitor, a liquid crystal display (LCD) screen, a light-emitting diode (LED) based display, an LED-backlit LCD display, a cathode ray tube (CRT) display, an electroluminescent (ELD) display, an electronic paper/ink display, a plasma display panel, an organic light-emitting diode (OLED) display, thin-film transistor display (TFT), High-Performance Addressing display (HPA), a surface-conduction electron-emitter display, a quantum dot display, an interferometric modulator display, a swept-volume display, a carbon nanotube display, a variforcal mirror display, an emissive volume display, a laser display, a holographic display, a light field display, a projector and surface upon which images are projected, or any other electronic device for outputting visual information. A display may include or be part of a touch screen. FIG. 1 depicts display 150 as part of device 100. However, in alternative embodiments, display 150 may be external to device 100. Moreover, in some embodiments, display 150 may be omitted entirely.

Figure 2:
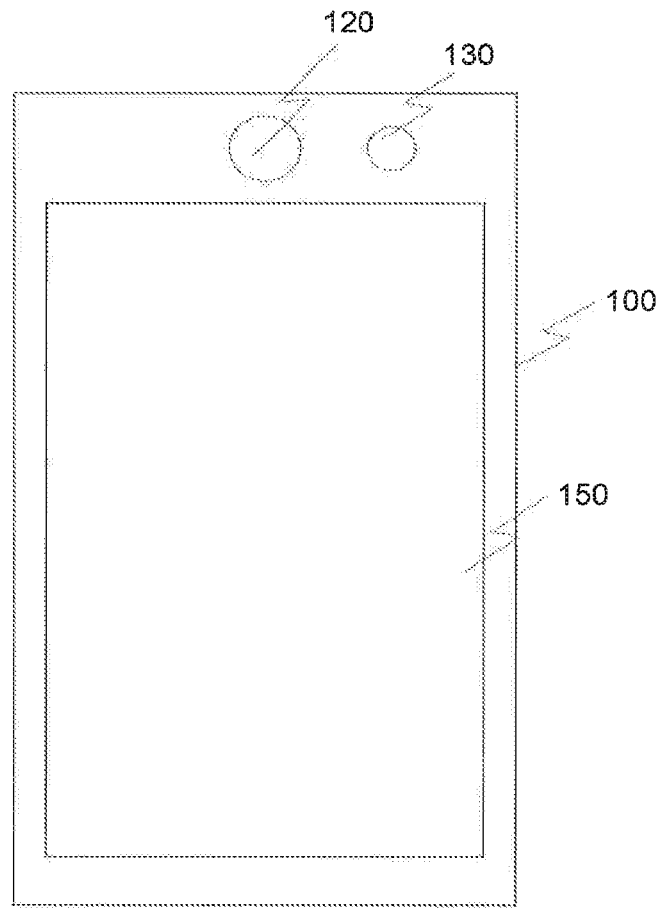
FIG. 2 illustrates an example graphical representation of the dual sensor control device, in accordance with some of the disclosed embodiments.

FIG. 2 provides one example of a graphical representation of device 100. As depicted in FIG. 2, image sensor 120 may be positioned to capture images of an area that may be viewed on display 150. Likewise, proximity sensor 130 may be positioned to capture proximity data associated with at least some display-viewable locations. In the example in FIG. 2, image sensor 120 is positioned in a central horizontal location and proximity sensor 130 is positioned to the side of image sensor 130. In other embodiments, however, both image sensor 120 and proximity sensor 130 may be positioned in a central horizontal location or both image sensor 120 and proximity sensor 130 may be positioned in non-central horizontal locations. Moreover, in some embodiments proximity sensor 130 is non-directional (that is, it may be configured to provide proximity data associated with objects in all directions); in such embodiments, proximity sensor 130 may be positioned anywhere on or in device 100, or outside of device 100.

Figure 3:
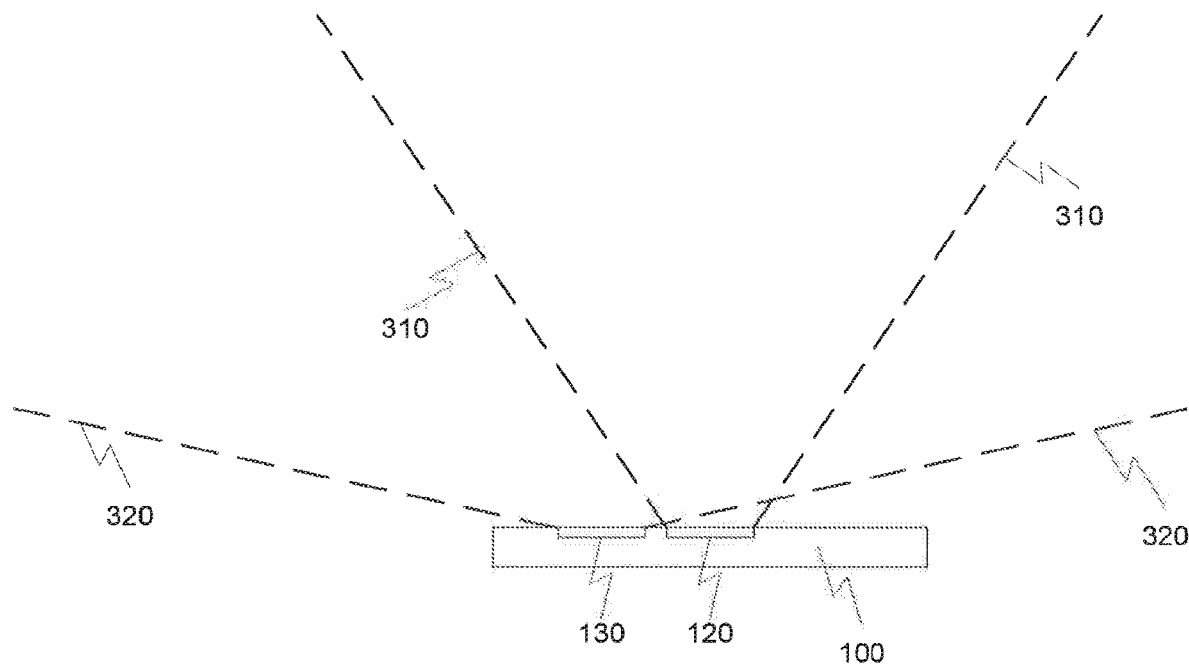
FIG. 3 illustrates another example graphical representation of the dual sensor control device, in accordance with some of the disclosed embodiments.

FIG. 3 provides another graphical representation of device 100. Broken lines 310 may be representative of a field of view of image sensor 120. Broken lines 320 may be representative of a region within which proximity sensor 130 may detect the presence of an object and/or detect the distance to an object. As can be seen in FIG. 3, in some embodiments the field of view of image sensor 120 may be narrower than the region within which proximity sensor 130 may detect the presence of an object and/or detect the distance to an object. However, in other embodiments, the field of view of proximity sensor 130 may be narrower than, or the same as, or pointing in a different direction than the field of view of image sensor 120.

Figure 4:
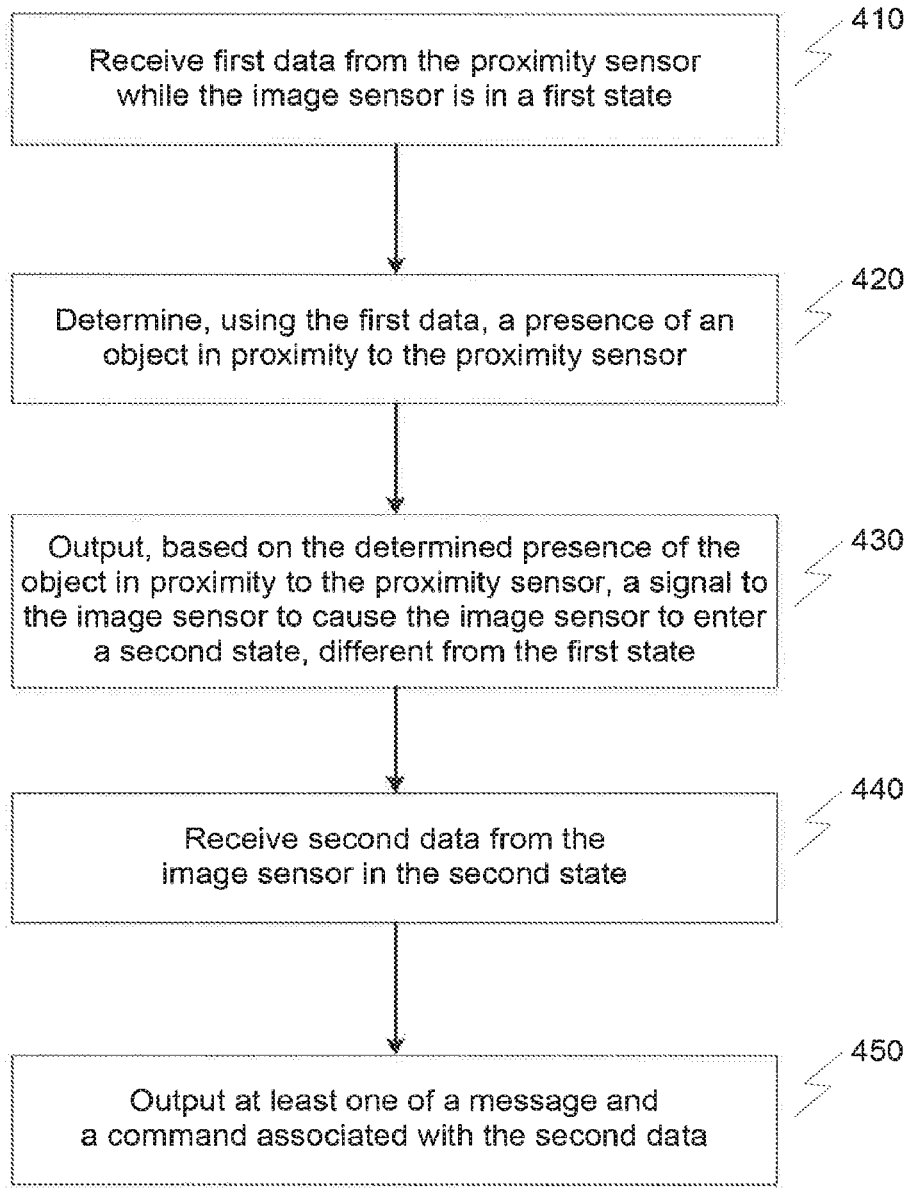
FIG. 4 illustrates an example process in accordance with some of the disclosed embodiments.

FIG. 4 illustrates an exemplary process 400 that processor 110 may be configured to perform. For example, as discussed above, processor 110 of device 100 may be configured to perform these operations by executing software or firmware stored in memory 140, or may be configured to perform these operations using dedicated hardware or one or more ASICs.

In some embodiments, at least one processor may be configured to receive first data from the proximity sensor while the image sensor is in a first state. For example, in connection with operation 410 in FIG. 4, processor 110 may be configured to receive first data from proximity sensor 130 while image sensor 120 is in a first state.

The first data, which may be received by processor 110, may include, any information indicative of a presence of an object to be detected. For example, the first data may include one-dimensional data reflective of a presence of an object within the region defined by broken lines 320 within a certain distance of proximity sensor 130. For example, in some embodiments, the one-dimensional data may indicate whether or not an object is within a predefined distance (e.g., 20 centimeters) from proximity sensor 130. In other embodiments, the one-dimensional data may indicate a distance from proximity sensor 130 to a nearest object. In other embodiments, the one-dimensional data may indicate whether or not any object is within a field of view of proximity sensor 130 (e.g., within broken lines 320). For example, in some embodiments, proximity sensor 130 may include a processor that determines whether or not any object is within a field of view of proximity sensor 130 and outputs the determination to processor 110.

In some embodiments, proximity sensor 130 may be configured to output to processor 110 an analog signal representative of the presence and/or distance to the object. In such embodiments, processor 110 may be configured to convert the analog signal to digital data indicative of the presence and/or distance to the object. For example, processor 110 may apply one or more thresholds to the analog signal to determine the presence and/or distance to the object. In other embodiments, processor 110 may receive digital data indicative of the presence and/or distance to the object directly from proximity sensor 130.

In some embodiments, the first data is associated with a first resolution. For example, the first resolution may be a single indication of a presence and/or distance of an object detected by a single sensor (e.g., one-dimensional data). In other embodiments, the first resolution may be a plurality of indications of a presence and/or distance of an object. For example, proximity sensor 130 may include a set of proximity sensors (e.g., a set of 16 proximity sensors) that each determine a presence and/or distance to an object within a region defined by broken lines 320.

The first state of the image sensor may include any mode of operation of the image sensor. As described in more detail below, image sensor 120 may be configured to operate in a first state and a second state, wherein the second state is different than the first state. For example, in some embodiments, the first state of image sensor 120 may include at least one of an off state and a first power state. The first power state may be, for example, a state in which image sensor 120 does not consume significant processor and/or battery resources as a byproduct of one or more settings associated with image sensor 120. For example, the first power state may include a stand-by mode. As another example, the first power state may include at least one of a first sampling rate, a first resolution, and a first exposure length. With a first sampling rate, image sensor 120 may be configured to capture only a limited small number of images. For example, image sensor 120 may only capture images after an express user request (e.g., after a user selects a picture capture button). A first sampling rate may also include, for example, pictures captured at a low frequency (e.g., image sensor 120 may automatically capture an image once a minute). Similarly, a first resolution may include a scenario in which some sensors associated with image sensor 120 are deactivated. For example, image sensor 120 may be composed of a grid of 1024 sensors. When operating at the first resolution, image sensor 120 may be configured to only use 16 of the sensors. A first exposure length may include, for example, a long exposure length (e.g., if processor resources are being conserved) or a short exposure length (e.g., if battery resources are being conserved).

The first state of image sensor 120 is not necessarily limited to power conservation states. For example, image sensor 120 may be used for a non-gesture detection related purpose (e.g., for photography). The first state of image sensor 120 may be a setting in which image sensor 120 is optimized for the non-gesture detection related purpose. For example, the resolution, frame rate, and exposure length of image sensor 120 may be optimized for the non-gesture detection related purpose. As one example, if image sensor 120 is used for photography, a higher resolution may be used than may be needed for gesture detection.

In some embodiments, processor 110 is further configured to determine whether the proximity sensor and the image sensor are facing a user based on information received from at least one of an accelerometer and a gyroscope. For example, device 100 may include at least one of an accelerometer and a gyroscope (not shown in FIG. 1). Processor 110 may be configured to receive data from the accelerometer and/or gyroscope. Processor 110 may be configured to use the data received from the accelerometer and/or gyroscope to determine a position and movement of device 100. Memory 140 may store data regarding various possible positions and/or motions and associated possible actions. For example, processor 110 may analyze the determined position and movement of device 100 to determine whether device 100 is moving back and forth (e.g., in a user's pocket) or moved upwards and then stationary (e.g., picked up by a user and then facing the user). Processor 110 may be configured to ignore the first data if a determination is made that the proximity sensor and the image sensor are not facing the user.

In some embodiments, at least one processor may be configured to determine, using the first data, a presence of an object in proximity to the proximity sensor. Consistent with embodiments of the invention, a processor may be configured to determine object presence by analyzing, in any way that determines object presence, data from a proximity sensor. For example, in operation 420 in FIG. 4, processor 110 may be configured to determine, using the first data, a presence of an object in proximity to proximity sensor 130.

The object may include, for example, one or more hands, one or more fingers, one or more fingertips, one or more other parts of a hand, or one or more hand-held objects associated with a user. The presence of the object may be determined based on the first data received from proximity sensor 130. In some embodiments, processor 110 may determine the presence of the object anytime the first data indicates an object is within the region defined by broken lines 320. In other embodiments, processor 110 may determine the presence of the object if the first data indicates that an object is within the region defined by broken lines 320 within a predetermined distance of proximity sensor 130.

As one example of the analysis of the first data, proximity sensor 130 may generate an analog signal that has a voltage level indicative of a distance to an object. If no object is in proximity to proximity sensor 130, the voltage level may be at, or close to, zero. If an object is located adjacent to the proximity sensor 130, the voltage level may be a maximum value such as, for example, 1 volt. If an object is within a predetermined distance to proximity sensor 130, the voltage level may reflect how close the object is to the proximity sensor 130 (e.g., if the object is at a midway point between the predetermined distance and proximity sensor 130, the voltage level may be at a middle value (e.g., 0.5 volts). Proximity sensor 130 may include a processor that converts the analog value to distance data. For example, proximity sensor 130 may access a database that maps analog values to distance values. Alternatively, the analog value may be transmitted to processor 110 that may convert the analog value to a distance value.

Processor 110 may be configured to enable gesture control based on the determined presence of the object in proximity to the proximity sensor. For example, as described in more detail below, processor 110 may be configured to change a state of image sensor 120 to permit gesture detection. Moreover, processor 110 may execute, for example, a gesture detection program stored in memory 140. In some embodiments, processor 110 is also configured to turn on display 150 based on the determined presence of the object in proximity to proximity sensor 130.

In some embodiments, at least one processor may be configured to output, based on the determined presence of the object in proximity to the proximity sensor, a signal to the image sensor to cause the image sensor to enter a second state, different from the first state. For example, in connection with operation 430 in FIG. 4, processor 110 may be configured to output, based on the determined presence of the object in proximity to proximity sensor 130, a signal to image sensor 120 to cause image sensor 120 to enter a second state, different from the first state.

For example, processor 110 may output the signal to image sensor 120 if processor 110 determines the presence of the object anywhere within a field of view of a proximity sensor. For example, processor 110 may output the signal to image sensor 120 if processor 110 determines the presence of the object within the region defined by broken lines 320 for a predetermined amount of time. As another example, processor 110 may output the signal to image sensor 120 if processor 110 determines the presence of the object within the region defined by broken lines 320 for any amount of time.

The second state of image sensor 120 may include, for example, at least one of an on state and a second power state higher than the first power state. For example, if the first state was an off state or stand-by mode, the second state may be an on state. Similarly, if the first state was a first power state, the second state may be a second power state higher than the first power state.

In some embodiments, the second state is at least one of a second sampling rate different than the first sampling rate, a second resolution different than the first resolution, and a second exposure length different than the first exposure length. For example, when operating with the second sampling rate, image sensor 120 may be configured to capture images more frequently than the first sampling rate. Similarly, when operating with the second resolution, image sensor 120 may be configured to use more sensors associated with image sensor 120 (e.g., the previously deactivated sensor of image sensor 120 may be reactivated). The second exposure length may include, for example, a short exposure length (e.g., if processor resources are being conserved in the first state) or a long exposure length (e.g., if battery resources are being conserved in the first state).

Moreover, as described above, the first state of image sensor 120 may be a setting in which image sensor 120 is optimized for a non-gesture detection related purpose that does not pertain to power conservation. In the second state, the resolution, frame rate, and exposure length of image sensor 120 may be optimized for gesture detection. For example, a resolution sufficient to detect the object, a frame rate sufficient to detect a gesture, and an exposure length sufficient to detect a gesture may be experimentally determined.

In some embodiments, processor 110 may be further configured to output the signal to the image sensor to enter the second state before the object reaches a field of view of the image sensor. For example, in some embodiments, processor 110 may output the signal to image sensor 120 immediately, before performing any other operations, after processor 110 determines the presence of the object in proximity to proximity sensor 130. As another example, memory 140 may store data regarding the amount of time a typical hand gesture would take to reach the field of view of image sensor 120 after being determined to be in proximity to proximity sensor 130. Processor 110 may be configured to calculate, using the data in memory 140, when to send the signal so that the signal arrives at image sensor 120 before the hand gesture enters the field of view of image sensor 120.

In some embodiments, at least one processor may be configured to receive second data from the image sensor in the second state. For example, in connection with operation 440 in FIG. 4, processor 110 may be configured to receive second data from image sensor 120 in the second state.

The second data may include any information received by a processor from an image sensor. For example, the second data may include two-dimensional data. The two-dimensional data may include, for example, image information captured by image sensor 120. The image information may include, for example, one or more of an analog image, a digital image, a subset of the analog image, a subset of the digital image, digital information processed by an image signal processor, a mathematical representation or transformation of information associated with data sensed by image sensor 120, visual information such as one or more frequencies in an image, conceptual information such as presence of one or more objects in the field of view of the image sensor. In some embodiments, the image information may also include, for example, information indicative of the state of image sensor 120, parameters of image sensor 120 such as exposure, frame rate, resolution of an image, color bit resolution, depth resolution, and field of view, information from other sensors during image capture, such as proximity sensor information, accelerometer information, information describing further processing that took place after an image is captured, illumination condition during image capture, features extracted from a digital image by image sensor 120, or any other information associated with data sensed by image sensor 120. The image information may include, for example, a single static image or a set of images (e.g., video).

In some embodiments, the second data is associated with a second resolution greater than the first resolution. For example, as discussed above, when operating with the second resolution, image sensor 120 may be configured to use more sensors associated with image sensor 120 (e.g., the previously deactivated sensor of image sensor 120 may be reactivated).

The second data may include one or more images of the object. For example, the second data may include image information associated with the field of view defined by broken lines 310. If a user places a hand, finger, or other object within the field of view defined by broken lines 310, image sensor 120 may capture an image of the hand, finger or other object.

Processor 110 may be configured to detect an object in the second data based on, for example, the contour and/or location of an object in the second data. For example, processor 110 may access a filter mask associated with the object and apply the filter mask to the second data to determine if the object is present in the second data. That is, for example, the location in the second data most correlated to the filter mask may be determined as the location of the object associated with the. Processor 110 may also be configured to access a plurality of different filter masks associated with a plurality of different hand poses. Thus, for example, a filter mask from the plurality of different filter masks that has a best correlation to the image information may cause a determination that the hand pose associated with the filter mask is the hand pose of the object. Other techniques for detecting real-world objects in image information (e.g., edge matching, greyscale matching, gradient matching, and other image feature based methods) are known in the art, and may also be used to detect the object in the second data. Moreover, the same techniques may be used to detect a plurality of objects in the second data. For example, processor 110 may be configured to detect a central location of a hand and a central location of each a tip of each finger of the hand that is visible in the second data. For example, U.S. Pat. Nos. 7,584,113 and 8,199,115 disclose techniques for performing object detection, both of which are incorporated herein by reference in their entirety.

In some embodiments, device 100 is configured to enable gesture control. For example, in some embodiments, processor 110 is further configured to enable gesture control based on the determined presence of the object in proximity to the proximity sensor. The gesture control may be based on, among other things, the second data. In some embodiments, the second data is reflective of a gesture. For example, the object may be performing a gesture at one or more times at which image sensor 120 captures an image of the object. Thus, the second data may be reflective of the object performing the gesture. In some embodiments, a gesture is performed by at least one of a hand and a finger. A gesture may include, for example, a swiping gesture, a pinching gesture of two fingers, a pointing gesture towards an object presented on a display, a left-to-right gesture, a right-to-left gesture, an upwards gesture, a downwards gesture, a pushing gesture, a waving gesture, a clapping gesture, a reverse clapping gesture, a gesture of splaying fingers on a hand, a reverse gesture of splaying fingers on a hand, a holding gesture associated with an object presented on a display for a predetermined amount of time, a clicking gesture associated with an object presented on a display, a double clicking gesture, a right clicking gesture, a left clicking gesture, a bottom clicking gesture, a top clicking gesture, a grasping gesture, a gesture towards an object presented on a display from a right side, a gesture towards an object presented on a display from a left side, a gesture passing through an object presented on a display, a blast gesture, a tipping gesture, a clockwise or counterclockwise two-finger grasping gesture over an object presented on a display, a click-drag-release gesture, a gesture sliding an icon such as a volume bar, or any other motion associated with a hand, finger, or other object.

In some embodiments, processor 110 is further configured to distinguish between a plurality of predefined gestures. For example, processor 110 may be configured to determine one or more locations associated with the object in the second data to determine the gesture performed by the object. For example, processor 110 may be configured to analyze the second data to determine that a hand of the user moves from a left side of the field of view of image sensor 120 to a right side of the field of view of image sensor 120 and, based on the determination, detect a left-to-right gesture. Similarly, processor 110 may be configured to analyze the second data to determine that one or more finger locations are moving back and forth in a circular motion and, based on the determination, detect a waving gesture. In some embodiments, processor 110 is further configured to determine the gesture based, at least in part, on an analysis of the first data and the second data. For example, processor 110 may be configured to determine the gesture in accordance with the operations described in more detail below for process 500.

In some embodiments, at least one processor may be configured to output at least one of a message and a command associated with the second data. For example, in connection with operation 450 of FIG. 4, processor 110 may be configured to output at least one of a message and a command associated with the second data. For example, processor 110 may be configured to address the message or command to any type of destination including, but not limited to, an operating system, one or more services, one or more applications, one or more devices, one or more remote applications, one or more remote services, or one or more remote devices.

A message may include, for example, a message to an application running on the external device, a service running on the external device, an operating system running on the external device, a process running on the external device, one or more applications running on a processor of the external device, a software program running in the background of the external device, or to one or more services running on the external device. Moreover, for example, the message may include a message to an application running on a device, a service running on the device, an operating system running on the device, a process running on the device, one or more applications running on a processor of the device, a software program running in the background of the device, or to one or more services running on the device.

The message may also include, for example, responsive to a selection of a graphical element, a message requesting data relating to a graphical element identified in an image from an application running on the external device, a service running on the external device, an operating system running on the external device, a process running on the external device, one or more applications running on a processor of the external device, a software program running in the background of the external device, or to one or more services running on the external device. The message may also include, for example, responsive to a selection of a graphical element, a message requesting a data relating to a graphical element identified in an image from an application running on a device, a service running on the device, an operating system running on the device, a process running on the device, one or more applications running on a processor of the device, a software program running in the background of the device, or to one or more services running on the device.

A command may include, for example, a command to run an application on the external device or website, a command to stop an application running on the external device or website, a command to activate a service running on the external device or website, a command to stop a service running on the external device or website, or a command to send data relating to a graphical element identified in an image. A message to a device may be a command. The command may be selected, for example, from a command to run an application on the device, a command to stop an application running on the device or website, a command to activate a service running on the device, a command to stop a service running on the device, or a command to send data relating to a graphical element identified in an image.

As discussed above, in some embodiments, the second data is reflective of at least a two-dimensional position of the object relative to the image sensor. Moreover, as discussed above, processor 110 may be configured to determine a gesture based on the second data that may be reflective of at least a two-dimensional position. In some embodiments, the at least one of a message and a command is further associated with the two-dimensional position. For example, processor 110 may be configured to determine a particular message or a particular command based on a gesture associated with the two-dimensional position. For example, memory 140 may store a database associating a plurality of different gestures to a plurality of different messages and/or a plurality of different commands. Processor 110 may be configured to select a particular message or command based on the database. For example, a left-to-right gesture may cause processor 110 to select a command to cause a picture shown on display 150 to move to the right. A waving gesture may cause processor 110 to select a command to cause an application running on device 100 to close.

As discussed above, in some embodiments the first data is reflective of at least a one-dimensional position of the object relative to the proximity sensor. Moreover, as discussed above, processor 110 may be configured to determine a gesture based on the first data. For example, processor 110 may be configured to detect a particular gesture if a user places an object in proximity to proximity sensor 130 in accordance with a predefined pattern (e.g., in proximity for a first predetermined time, then out of proximity, and then in proximity for a second predetermined time). In some embodiments, the at least one of a message and a command is further associated with the one-dimensional position. For example, processor 110 may be configured to select at least one of a message and a command based on the detected particular gesture. For example, processor 110 may be configured to select at least one of a message and a command by choosing at least one of a message and a command associated with the detected particular gesture in the database.

As discussed above, in some embodiments processor 110 may be configured to determine a gesture based on the first data, which may include at least a one-dimensional position of the object, and the second data, which may include at least a two-dimensional position of the object. As discussed in more detail below with respect to process 500, processor 110 may be configured to determine a gesture based on the first data and the second data. Moreover, as discussed in more detail below with respect to process 500, in some embodiments the at least one of a message and a command is further associated with the one-dimensional position and the two-dimensional position. For example, processor 110 may be configured to select at least one of a message and a command based on a determined gesture associated with the one-dimensional position and the two-dimensional position.

In some embodiments, the at least one of a message and a command is further associated with the first data obtained before the object reaches the field of view of the image sensor and the second data obtained after the object reaches the field of view of the image sensor. For example, the first data from proximity sensor 130 obtained before the object (e.g., a hand or finger) reaches the field of view of image sensor 140 may be combined with the second data from image sensor 120 to determine three-dimensional information about the object. Processor 110 may be configured to perform the combination in the manner described below with respect to process 500. The three-dimensional information may be analyzed to determine a gesture in the manner described below with respect to process 500.

In some embodiments, processor 110 is further configured to output a second signal to the image sensor to cause the image sensor to enter a third state after a predefined condition is met. For example, processor 110 may be configured to determine, using data from the proximity sensor, if the object exits a field of view of the proximity sensor, and output, based on the determined exit, a second signal to the image sensor to cause the image sensor to enter the third state. The third state may be, for example, any state that is different than the second state, any of the states described above with respect to the first state, or any state that requires less power than the second state, but more power than the first state. The predefined condition may include, for example a determination that the object exits a field of view of proximity sensor 130. Other examples of the predefined condition may include, for example, a button selection that turns off device 100, a determination that the object exits a field of view of image sensor 120, a determination that no object has been detected by proximity sensor 130 for a predetermined amount of time, a button selection that turns off display 150, a predetermined gesture, a predetermined state of the device, a position of the device, an application running in foreground, and an application is running at background.

In some embodiments, processor 110 is further configured to output a second signal to the proximity sensor to cause the proximity sensor to change to a different state. For example, the different state of proximity sensor 130 may include at least one of an off state, a state having a changed sampling rate, and a state having a changed power mode. Processor 110 may be configured to output the second signal to proximity sensor 130 to cause proximity sensor 130 to change to a different state based on, for example, a button selection that turns off device 100 or a button selection that turns off display 150.

Figure 5:
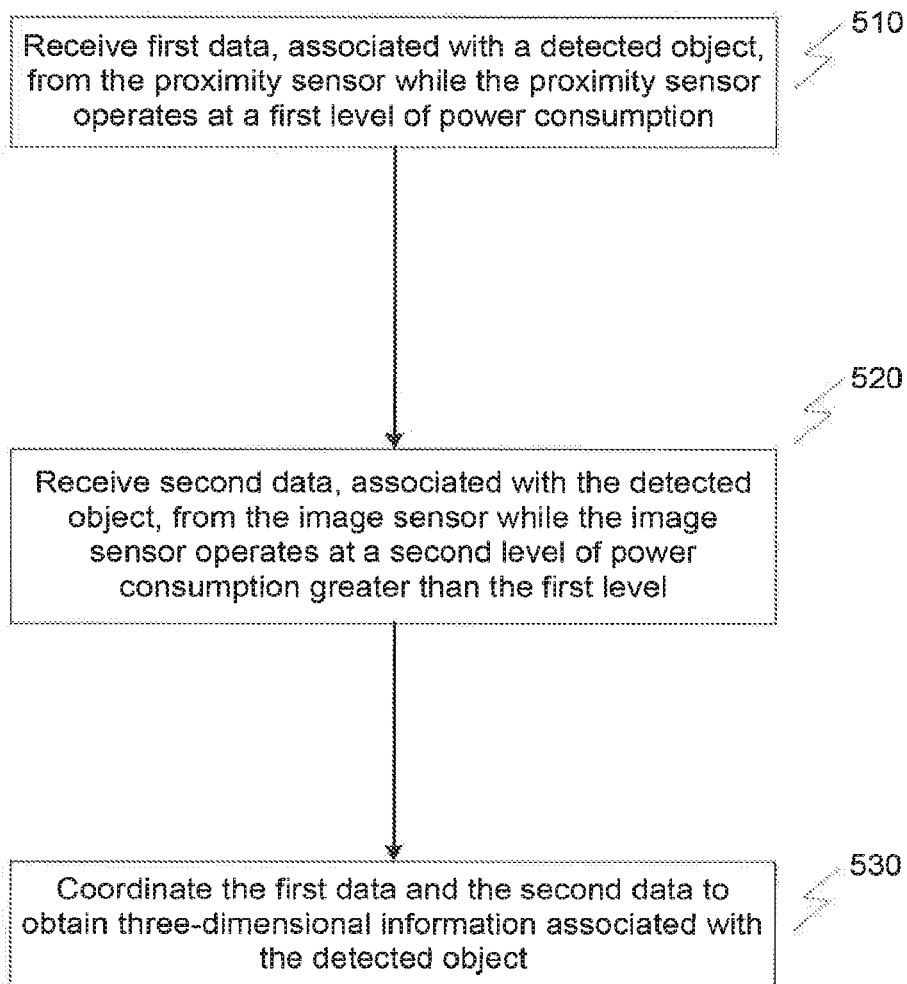
FIG. 5 illustrates another example process in accordance with some of the disclosed embodiments.

FIG. 5 illustrates an exemplary process 500 that processor 110 may be configured to perform. For example, as discussed above, processor 110 of device 100 may be configured to perform these operations by executing software or firmware stored in memory 140, or may be configured to perform these operations using dedicated hardware or one or more ASICs.

In some embodiments, at least one processor may be configured to receive first data, associated with a detected object, from the proximity sensor while the proximity sensor operates at a first level of power consumption, wherein the first data is reflective of at least a one-dimensional position of the object relative to the proximity sensor. For example, in connection with operation 510 of FIG. 5, processor 110 may be configured to receive first data, associated with a detected object, from proximity sensor 130 while proximity sensor 130 operates at a first level of power consumption. The first data may be reflective of at least a one-dimensional position of the object relative to proximity sensor 130.

The detected object may include, for example, any of the objects described above. For example, the detected object may include one or more hands, one or more fingers, one or more fingertips, one or more other parts of a hand, or one or more hand-held objects associated with a user. As described above with reference to process 400, the first data may include, for example, a one-dimensional position reflective of a presence of an object within the region defined by broken lines 320 within a certain distance of proximity sensor 130. For example, in some embodiments, a one-dimensional position may indicate whether or not an object is within a predefined distance (e.g., 20 centimeters) from proximity sensor 130. In other embodiments, the one-dimensional position may indicate a distance from proximity sensor 130 to a nearest object. In some embodiments, the one-dimensional position may reflect the strength of a signal detected by proximity sensor 130.

As described above, in some embodiments, proximity sensor 130 may be configured to output to processor 110 an analog signal representative of the presence and/or distance to the object. In such embodiments, processor 110 may be configured to convert the analog signal to digital data indicative of the presence and/or distance to the object. For example, processor 110 may apply one or more thresholds to the analog signal, or map the analog signal to distances using a database, to determine the presence and/or distance to the object. In other embodiments, processor 110 may receive digital data indicative of the presence and/or distance to the object directly from proximity sensor 130. A one-dimensional position may include, for example, any information reflective of a distance to an object, such as an actual distance from proximity sensor 130, a relative distance between the object and another location, a range of possible distance, an indication of whether the object is moving away from proximity sensor 130, an indication of whether the object is moving toward proximity sensor 130, and the like.

In some embodiments the first data is associated with a first resolution. For example, the first resolution may be a single indication of a presence and/or distance of an object detected by a single sensor (e.g., one-dimensional data). In other embodiments, the first resolution may be a plurality of indications of a presence and/or distance of an object. For example, proximity sensor 130 may include a set of 16 proximity sensors that each determine a presence and/or distance to an object within a region defined by broken lines 320.

The first level of power consumption associated with proximity sensor 130 may include, for example, a relatively low power consumption. For example, as described below, the first level of power consumption may be lower than a power consumption associated with image sensor 120. For example, each of the sensors associated with proximity sensor 130 may require a particular amount of power to operate. Moreover, proximity sensor 130 may be configured to operate at various different power consumptions based on a rate of sensing. For example, proximity sensor 130 may be configured to sense an object in proximity to it once every 10 milliseconds, once every second, once every 10 seconds, once every minute, or at any other frequency. In some embodiments, proximity sensor 130 may operate at a first frequency until the object is detected, and then proximity sensor 130 may operate at a second frequency greater than the first frequency.

In some embodiments, at least one processor may be configured to receive second data, associated with the detected object, from the image sensor while the image sensor operates at a second level of power consumption greater than the first level, wherein the second data is reflective of at least a two-dimensional position of the object relative to the image sensor. For example, in connection with operation 520 of FIG. 5, processor 110 may be configured to receive second data, associated with the detected object, from image sensor 120 while image sensor 120 operates at a second level of power consumption greater than the first level. The second data may be reflective of at least a two-dimensional position of the object relative to image sensor 120.

As described above with reference to process 400, the second data may include, for example, two-dimensional data. The two-dimensional data may include, for example, image information captured by image sensor 120. The image information may include, for example, one or more of an analog image, a digital image, a subset of the analog image, a subset of the digital image, digital information processed by an image signal processor, a mathematical representation or transformation of information associated with data sensed by image sensor 120, visual information such as one or more frequencies in an image, conceptual information such as presence of one or more objects in the field of view of the image sensor. In some embodiments, the image information may also include, for example, information indicative of the state of image sensor 120, parameters of image sensor 120 such as exposure, frame rate, resolution of an image, color bit resolution, depth resolution, and field of view, information from other sensors during image capture, such as proximity sensor information, accelerometer information, information describing further processing that took place after an image is captured, illumination condition during image capture, features extracted from a digital image by image sensor 120, or any other information associated with data sensed by image sensor 120. The image information may include, for example, a single static image or a set of images (e.g., video).

In some embodiments, the second data is associated with a second resolution greater than the first resolution. For example, as discussed above, when operating with the second resolution, image sensor 120 may be configured to use more sensors associated with image sensor 120 (e.g., the previously deactivated sensor of image sensor 120 may be reactivated).

The second data may include one or more images of the object. For example, the second data may include image information associated with the field of view defined by broken lines 310. If a user places a hand, finger, or other object within the field of view defined by broken lines 310, image sensor 120 may capture an image of the hand, finger or other object. Whereas the first data may be reflective of a distance to the object, the second data may be reflective of the horizontal and vertical position of the object. Thus, the two-dimensional position may include a horizontal position of the object and a vertical position of the object. The horizontal and vertical positions may be, for example, offsets from the position of image sensor 120, may be relative positions within an image captured by image sensor 120, or may be some other values reflective of a horizontal position and vertical position of the object.

Processor 110 may be configured to detect an object in the second data based on, for example, the contour and/or location of an object in the second data. For example, processor 110 may access a filter mask associated with the object and apply the filter mask to the second data to determine if the object is present in the second data. That is, for example, the location in the second data most correlated to the filter mask may be determined as the location of the object associated with the. Processor 110 may also be configured to access a plurality of different filter masks associated with a plurality of different hand poses. Thus, for example, a filter mask from the plurality of different filter masks that has a best correlation to the image information may cause a determination that the hand pose associated with the filter mask is the hand pose of the object. Other techniques for detecting real-world objects in image information (e.g., edge matching, greyscale matching, gradient matching, and other image feature based methods) are known in the art, and may also be used to detect the object in the second data. Moreover, the same techniques may be used to detect a plurality of objects in the second data. For example, processor 110 may be configured to detect a central location of a hand and a central location of each a tip of each finger of the hand that is visible in the second data. For example, U.S. Pat. Nos. 7,584,113 and 8,199,115 disclose techniques for performing object detection, both of which are incorporated herein by reference in their entirety.

The second level of power consumption associated with image sensor 120 may be higher than the first level of power consumption associated with proximity sensor 130. For example, image sensor 120 may include a large number of sensors that each require a relatively large amount of power as compared to the one or more sensors of proximity sensor 130 and/or may operate at a high frequency (requiring more overall power) than proximity sensor 130.

In some embodiments, processor 110 is further configured to determine whether the proximity sensor and the image sensor are facing a user based on information received from at least one of an accelerometer and a gyroscope. For example, as described above, device 100 may include at least one of an accelerometer and a gyroscope (not shown in FIG. 1) and may be configured to receive data from the accelerometer and/or gyroscope. Processor 110 may be configured to use the data received from the accelerometer and/or gyroscope to determine a position and movement of device 100. Memory 140 may store data regarding various possible positions and/or motions and associated possible actions. For example, processor 110 may analyze the determined position and movement of device 100 to determine whether device 100 is moving back and forth (e.g., in a user's pocket) or moved upwards and then stationary (e.g., picked up by a user and then facing the user). Processor 110 may be configured to ignore the first data and the second data if a determination is made that the proximity sensor and the image sensor are not facing the user.

In some embodiments, at least one processor may be configured to coordinate the first data and the second data to obtain three-dimensional information associated with the detected object. For example, in connection with operation 530 of FIG. 5, processor 110 may be configured to coordinate the first data and the second data to obtain three-dimensional information associated with the detected object. The coordination of the first data and the second data may include, for example, generating, for one or more times, three-dimensional information. For example, the first data may include one or more times at which the first data was captured. Likewise, the second data may include one or more times at which the second data was captured. Processor 110 may be configured, for example, to match information in the first data and information in the second data associated with the same time or substantially the same time (e.g., captured within a time interval in which a hand or finger will exhibit little or no movement). However, processor 110 may also be configured to match information in the first data and information in the second data regardless of time.

As discussed above, processor 110 may be configured to determine information regarding the distance to the object from the first data and information regarding the horizontal and vertical position of the object from the second data. Processor 110 may be configured to combine the distance information, the horizontal position information, and the vertical position information to obtain the three-dimensional information. For example, the distance information, horizontal information, and vertical information may each be associated with the location of the object. Moreover, as discussed above, processor 110 may be configured to determine a plurality of objects in the second data (e.g., a plurality of finger tips and a whole hand). In some embodiments, the distance information associated with the first data may be applied to the horizontal and vertical locations of each of the plurality of objects detected in the second data. However, if proximity sensor 130 includes a resolution sufficient to distinguish between a plurality of objects, different portions of the first data representative of the distance to a plurality of the objects may be associated with corresponding horizontal and vertical positions of each of the plurality of objects.

In some embodiments, processor 110 may be configured to determine a series of three-dimensional positions of the object, determined from a series of information regarding distance, horizontal position, and vertical position captured at a plurality of different times. Each three-dimensional position of the object may be determined, for example, in the manner described above. Moreover, in some embodiments, processor 110 may be configured to determine a series of three-dimensional positions of each of the plurality of objects (e.g., a series of three-dimensional positions associated with a user's finger tips and whole hand).

In some embodiments, processor 110 is further configured to determine a gesture using the three-dimensional information. For example, the gesture is performed by at least one of a hand and a finger. In addition to the gestures described above in process 400, the gesture may include, for example, a zoom-in gesture, a zoom-out gesture, a clockwise circular gesture, a counter-clockwise circular gesture, a gesture parallel to a display, a gesture non-parallel to a display, a directional gesture in which the object starts close to the device and then moves away, or a directional gesture in which the object starts away from the device and then moves close to the device.

Figure 6A:
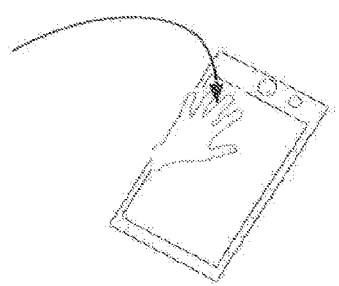
FIGS. 6A-6F illustrate several graphical representations of gestures.
Figure 6B:
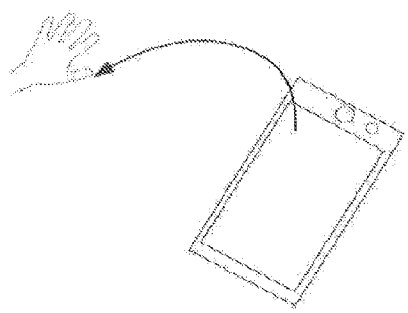

FIG. 6A graphically depicts an example of a zoom-in gesture. A zoom-in gesture may include, for example, a movement in which two or more fingers move away from each other as a hand moves toward display 150. FIG. 6B graphically depicts an example of a zoom-out gesture. A zoom-out gesture may include, for example, a movement in which two or more fingers move towards each other as a hand moves away from display 150. If using only horizontal and vertical position data, it may be difficult to distinguish between a zoom-in gesture and a zoom-out gesture. For example, a user may initially have a plurality of finger tips separated before bringing them together to start a zoom-in gesture; the initial phase may be confused for a zoom-out gesture. Similarly, a user may initially have a plurality of finger tips touching before separating them to start a zoom-out gesture; this initial phase may be confused for a zoom-in gesture. Processor 110 may be configured to distinguish between a zoom-in gesture and a zoom-out gesture using the three-dimensional information. For example, processor 110 may be configured to determine, using the first data, whether the detected object is moving toward or away from the device, to determine, using the second data, whether one or more fingers associated with the detected object are spread or closed, and to determine at least one of zoom-in gesture and a zoom-out gesture based on the determination of whether the detected object is moving toward or away from the device and the determination of whether the one or more fingers associated with the detected object are spread or closed. For example, if processor 110 determines that the detected object is moving toward the device and the one or more fingers associated with the detected object are initially closed and then spread as the detected object moves toward the device, processor 110 may detect a zoom-in gesture. If processor 110 determines that the detected object is moving away from the device and the one or more fingers associated with the detected object are initially spread and the closed as the detected object moves away from the device, processor 110 may detect a zoom-out gesture.

As another example, processor 110 may be configured to detect a zoom-in gesture if processor 110 detects fingers that are spread while a hand moves toward the device, initially stay open while the hand moves away from the device, and then close while the hand is away from the device. As another example, processor 110 may be configured to detect a zoom-out gesture if processor 110 detects fingers that are spread while a hand moves toward the device, are closed as the hand when the hand is near the device, and stay closed as the hand moves backwards away from the device.

Figure 6C:
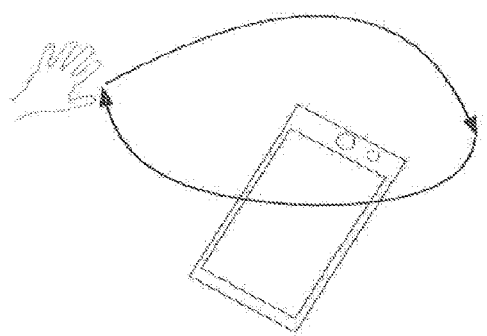
Figure 6D:
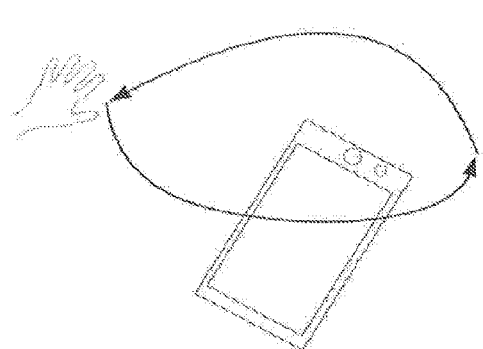

In some embodiments, processor 110 is further configured to determine a circular gesture. A circular gesture may include, for example, a clockwise circular gesture or a counter-clockwise circular gesture. FIG. 6C graphically depicts an example of a clockwise circular gesture. A clockwise circular gesture may include, for example, a gesture in which the object (e.g., a hand or finger) make a circular, approximately circular, elliptical, or approximately elliptical motion that approaches and moves away from display 150 in a first direction. FIG. 6D graphically depicts an example of a counter-clockwise circular gesture. A counter-clockwise circular gesture may include, for example, a gesture in which the object (e.g., a hand or finger) make a circular, approximately circular, elliptical, or approximately elliptical motion that approaches and moves away from display 150 in a second direction opposite the first direction. If only two-dimensional horizontal and vertical position data from the second data were analyzed, it may be difficult to distinguish between a clockwise circular gesture and a counter-clockwise direction, since in both scenarios image sensor 120 may see the object moving left-to-right and right-to-left. That is, the same left-to-right and right-to-left motion may be exhibited in both a clockwise circular gesture and a counter-clockwise circular gesture In some embodiments, however, processor 110 is configured to distinguish between a clockwise circular gesture and a counter-clockwise circular gesture. In particular, processor 110 may be configured to analyze the distance of the object to proximity sensor 130 as the object moves to distinguish between a clockwise circular gesture and a counter-clockwise circular gesture. As one example, if processor 110 determines that the object approaches device 110 moving left-to-right, continues to approach device 110 moving right-to-left, then begins to move away from device 110 still moving right-to-left, and then continues to move away from device 110 moving left-to-right, processor 110 may determine a clockwise circular gesture. If processor 110 determines that the object moves away from device 110 moving left-to-right, continues to move away from device 110 moving right-to-left, then begins to move toward device 110 still moving right-to-left, and then continues to move toward device 110 moving left-to-right, processor 110 may determine a counter-clockwise circular gesture.

Figure 6E:
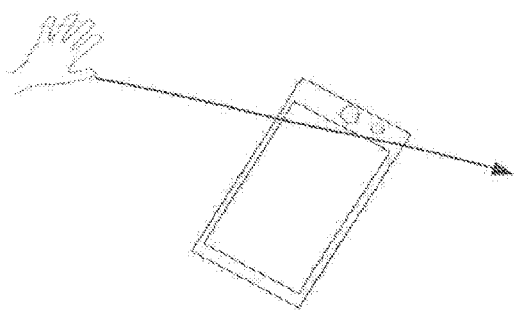
Figure 6F:
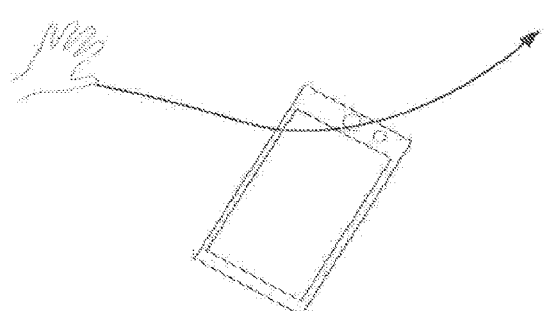

In some embodiments, processor 110 is further configured to determine, using the first data, whether the object performed a gesture parallel to a display. For example, as depicted in FIG. 6E, the object may move parallel to display 150 in a right-to-left direction. In contrast, as depicted in FIG. 6F, the object may move in a right-to-left direction while moving away from proximity sensor 130. As another example of a non-parallel gesture, the object may move in a right-to-left direction while moving toward proximity sensor 130. Parallel and non-parallel gestures that follow the same horizontal and vertical path, but a different distance path, may be difficult to distinguish using only the second data. However, processor 110 may be configured to determine whether the object performed a gesture parallel to display 150 by analyzing the first data. For example, processor 110 may determine a gesture parallel to display 150 if the distance to proximity sensor 150 remains constant, decreases at a constant rate associated with the offset between proximity sensor 130 and display 150, or increases at a constant rate associated with the offset between proximity sensor 130 and display 150.

In some embodiments, processor 110 is further configured to determine, using the first data, whether the object performed a tapping gesture. For example, processor 110 may be configured to analyze the first data and the second data to determine whether a hand moves toward the device and then away from the device. If processor 110 determines a hand moves toward the device and then away from the device, processor 110 may detect a tapping gesture.

In some embodiments, processor 110 is further configured to output at least one of a message and a command associated with the three-dimensional information. A message may include the various messages described above in process 400. Likewise, a command may include the various commands described above in process 400.

In some embodiments, processor 110 may be configured to output at least one of a message associated with the determined gesture and a command associated with the determined gesture to thereby enable gesture control. For example, if a zoom-in gesture is detected by processor 110, processor 110 may be configured to output a command to an application displaying a picture on display 150 to enlarge a portion of the picture. The portion of the picture that is enlarged may be based on, for example, a location of the object in relation to display 150. For example, the portion of the picture that is enlarged may correspond to the location on display 150 that is perpendicular to the object. Similarly, if a zoom-out gesture is detected by processor 110, processor 110 may be configured to output a command to an application displaying a picture on display 150 to decrease the size of the picture.

As another example, if a clockwise circular gesture is detected by processor 110, processor 110 may be configured to output a command to an application displaying a window on display 150 that is larger than display 150 (e.g., a browser showing a website with several pages of content) to scroll in a first direction (e.g., up, down, left, or right). Similarly, if a counter-clockwise circular gesture is detected by processor 110, processor 110 may be configured to output a command to an application displaying a window on display 150 that is larger than display 150 to scroll in a second direction different than the first direction (e.g., in a direction opposite to the first direction).

As another example, if a gesture parallel to display 150 is detected by processor 110, processor 110 may be configured to output a command to an application displaying a picture of display 150 to move the picture in the direction of the gesture. However, if processor 110 detects a non-parallel gesture rather than the parallel gesture, even if in the same direction as the parallel gesture, processor 110 may be configured to act differently. For example, if processor 110 detects non-parallel gesture in an upwards direction relative to display 150, processor 110 may be configured to output a message to external speakers to increase audio volume. As another example, processor 110 may also be configured to output a command to activate an application or service based on a detected gesture.

As another example, if a tapping gesture is detected by processor 110, processor 110 may be configured to output a command to select a button associated with an application that is presented on display 150. As another example, if a tapping gesture is detected by processor 110, processor 110 may be configured to output a command to activate an application associated with the tapping gesture.

Figure 7:
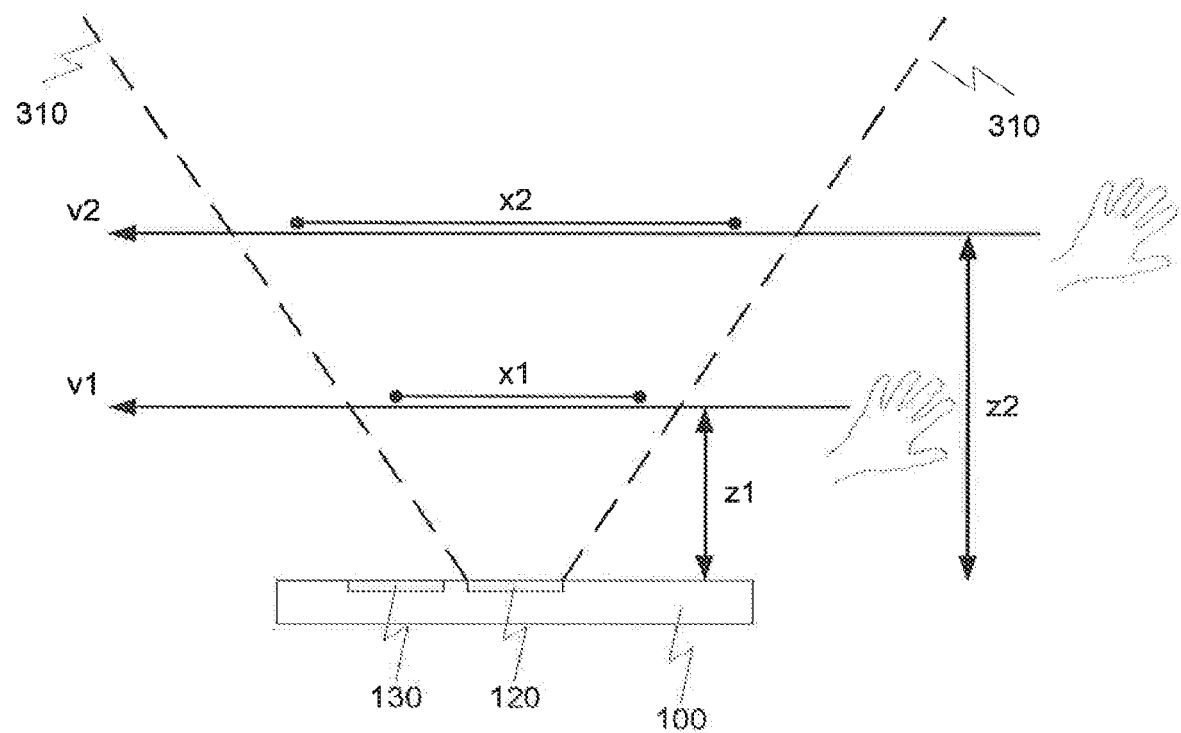
FIG. 7 illustrates a graphical representation of a gesture speed determination.

In some embodiments, processor 110 is further configured to determine, using the first data, a distance of the object from the proximity sensor; determine, using the second data, a movement of the object, and determine, using the distance and the movement, a speed of the object. FIG. 7 depicts two exemplary speed determinations. As a first example, processor 110 may determine that the distance to the object equals z1 and that the object has moved horizontally across a first portion of the field of view of image sensor 120 by an amount x1 during a first time period. Image sensor 120 may provide processor 110 with image sensor 120's field of view, or processor 110 may access data regarding the field of view from memory 140. Based on the field of view data, the distance data, and the data regarding the horizontal motion of the object, processor 110 may be configured to calculate an actual distance travelled by the object. For example, Processor 110 may be configured to determine a total length covered by a field of view at a particular distance, and multiply the total length by the percentage of the field of view that the object covered when moving horizontally. Processor 110 may be configured to divide the actual distance travelled by the first time period to determine a speed of the object v1.

As a second example, processor 110 may determine that the distance to the object equals z2 and that the object has moved horizontally across a first portion of the field of view of image sensor 120 by an amount x2 during a first time period. As can be seen in FIG. 7, z2 may be a longer distance than z1, and x2 may be an equal portion of the field of view of image sensor 120 as x1. Using the same technique described above, processor 110 may determine that the speed of the object associated with z2 and x2 is v2. Because z2 is greater than z1, in this example v2 is greater than v1. Thus, processor 110 may be configured to determine a speed associated with a gesture.

For example, as described above, processor 110 may be configured to determine at least one of a left-to-right gesture and right-to-left gesture using the three-dimensional information. In some embodiments, in a left-to-right gesture and right-to-left gesture, the object is a hand. Processor 110 may be configured to determine the speed of the object such that the speed is reflective of a hand speed.

Similarly, as described above, processor 110 may be configured to determine a circular gesture using the three-dimensional information. In some embodiments, in a circular gesture the object is a finger. Processor 110 may be configured to determine the speed of the object such that the speed is reflective of a finger speed. The message or command may reflect the speed of the object. For example, a relatively fast clockwise circular gesture (e.g., one rotation in less than half a second) may cause processor 110 to output a command to cause a window on display 150 exhibit a large scroll (e.g., the window may scroll down an entire page for each rotation). On the other hand, a relatively slow clockwise circular gesture (e.g., one rotation in more than half a second) may cause processor 110 to output a command to cause a window on display 150 exhibit a small scroll (e.g., the window may scroll one line for each rotation).

By using image sensor 120 and proximity sensor 130 in accordance with the disclosed embodiments, various improvements on known techniques for performing touch-free gesture detection can be achieved. For example, in some embodiments, battery and processor resources of device 100 may be conserved by implementing processes 400 and 500. As another example, in some embodiments, improved gesture detection associated with three-dimensional information may be achieved by implementing process 500.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable sub-combination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments have been described. Other embodiments are within the scope of the following claims.

What is claimed is:

1. A device for detection of object location and motion, comprising:
    at least one processor for receiving information from a proximity sensor and an image sensor, the at least one processor being configured to:
    receive first data from the proximity sensor;
    detect, using the received first data, a presence of an object in proximity to the proximity sensor;
    receive, from the image sensor, second data reflective of images of the object;
    detect, based on a combination of the first data and the second data, a zoom gesture, wherein the at least one processor is further configured to distinguish the zoom gesture between a zoom-in gesture and a zoom-out gesture using the combination of the first data and the second data; and
    output at least one of a message and a command associated with the zoom gesture.

2. The device of claim 1, wherein the first data is reflective of at least a one-dimensional position of the object relative to the proximity sensor.

3. The device of claim 1, wherein the second data is reflective of at least a two-dimensional position of the object relative to the image sensor.

4. The device of claim 1, wherein the at least one processor is further configured to detect the object in the second data based on at least one of a contour or a location of the object in the second data.

5. The device of claim 1, wherein the object is at least one of a hand, a finger, and a handheld object used for pointing.

6. The device of claim 1, wherein detecting the zoom gesture further comprises:
determining, using the first data, whether the object is moving toward or away from the device;
determining, using the second data, whether one or more fingers associated with the detected object are spread or closed; and
determining the zoom gesture based on the determination of whether the object is moving toward or away from the device and the determination of whether the one or more fingers associated with the detected object are spread or closed.

7. The device of claim 1, wherein detecting the zoom gesture further comprises:
determining, using the first data and the second data, whether one or more fingers associated with the object are open or closed while the object moves toward the device;
determining, using the first data and the second data, whether the one or more fingers associated with the object are open or closed while the object moves away from the device; and
determining the zoom gesture based on a combination of the determination of whether the one or more fingers associated with the object are open or closed while the object moves toward the device and the determination of whether the one or more fingers associated with the object are open or closed while the object moves away from the device.

8. The device of claim 1, wherein the at least one processor is further configured to output the message or the command associated with the zoom gesture to enable gesture control.

9. The device of claim 1, wherein the first state is an off state, and the second state is an on state.

10. The device of claim 1, wherein the first state is associated with at least one of a first sampling rate, a first resolution, and a first exposure length, and the second state is at least one of a second sampling rate different than the first sampling rate, a second resolution different than the first resolution, and a second exposure length different than the first exposure length.

11. The device of claim 1, wherein the first data is associated with a first resolution and the second data is associated with a second resolution greater than the first resolution.

12. The device of claim 1, wherein the at least one processor is further configured to:
determine, using data from the proximity sensor, if the object exits a field of view of the proximity sensor; and
output, based on the determined exit, a second signal to the image sensor to cause the image sensor to enter a third state.

13. The device of claim 1, wherein the at least one processor is further configured to:
determine, using the first data, information associated with the distance to the object;
determine, using the second data, information associated with a horizontal position and a vertical position of the object; and
combine the distance information, the horizontal position information, and the vertical position information to determine a three-dimensional gesture.

14. The device of claim 1, wherein the at least one processor is further configured to determine a circular gesture based on the combination of the first data and the second data.

15. The device of claim 1, wherein the at least one processor is further configured to distinguish between a clockwise circular gesture and a counter-clockwise circular gesture based on the combination of the first data and the second data.

16. A device for detection of object location and motion, comprising:
at least one processor for receiving information from a proximity sensor and an image sensor, the at least one processor being configured to:
receive first data from the proximity sensor;
detect, using the received first data, a presence of an object in proximity to the proximity sensor;
receive, from the image sensor, second data reflective of images of the object;
detect, based on a combination of the first data and the second data, a zoom gesture, wherein the at least one processor is further configured to distinguish the zoom gesture between a zoom-in gesture and a zoom-out gesture using the combination of the first data and the second data; and
output at least one of a message and a command associated with the detected zoom gesture to enable gesture control.

17. The device of claim 16, wherein the object is at least one of a hand, a finger, and a handheld object used for pointing.

18. The device of claim 16, wherein detecting the zoom gesture further comprises:
determining, using the first data, whether the object is moving toward or away from the device;
determining, using the second data, whether one or more fingers associated with the detected object are spread or closed; and
determining the zoom gesture based on the determination of whether the object is moving toward or away from the device and the determination of whether the one or more fingers associated with the detected object are spread or closed.

19. The device of claim 16, wherein detecting the zoom gesture further comprises:
determining, using the first data and the second data, whether one or more fingers associated with the object are open or closed while the object moves toward the device;
determining, using the first data and the second data, whether the one or more fingers associated with the object are open or closed while the object moves away from the device; and
determining the zoom gesture based on a combination of the determination of whether the one or more fingers associated with the object are open or closed while the object moves toward the device and the determination of whether the one or more fingers associated with the object are open or closed while the object moves away from the device.

20. A device for detection of object location and motion, comprising:
at least one processor for receiving information from a proximity sensor and an image sensor, the at least one processor being configured to:

receive, from the proximity sensor, first data indicative of a presence of an object in proximity to the proximity sensor;

receive, from the image sensor, second data reflective of images of the object;

detect, based on a combination of the first data and the second data, a zoom gesture performed by the object; and output at least one of a message and a command associated with the zoom gesture, wherein detecting the zoom gesture further comprises:

determining, using the first data and the second data, whether one or more fingers associated with the object are open or closed while the object moves toward the device;

determining, using the first data and the second data, whether the one or more fingers associated with the object are open or closed while the object moves away from the device; and determining the zoom gesture based on a combination of the determination of whether the one or more fingers associated with the object are open or closed while the object moves toward the device and the determination of whether the one or more fingers associated with the object are open or closed while the object moves away from the device.

21. A non-transitory computer-readable medium comprising instructions that, when executed by at least one processor, cause the at least one processor to perform operations including:

receiving first data from the proximity sensor while the image sensor is in a first state;

detecting, using the received first data, a presence of an object in proximity to the proximity sensor;

extracting, using the received first data, proximity sensor information associated with the detected object;

outputting, based on the detected presence of the object, a signal to cause the image sensor to enter a second state different from the first state;

receiving, from the image sensor in the second state, second data reflective of images of the object;

extracting, using the received second data, image information reflective of images of the object;

determining, based on a combination of the proximity sensor information associated with the detected object and the extracted image information reflective of images of the object, a zoom gesture performed by the object, wherein the at least one processor is further configured to distinguish the determined zoom gesture between a zoom-in gesture and a zoom-out gesture using the combination of the first data and the second data; and outputting at least one of a message and a command associated with the zoom gesture.

* * * * *